United States Patent [19]

Yano et al.

[11] Patent Number: 4,946,906

[45] Date of Patent: Aug. 7, 1990

[54] PROCESS FOR PRODUCING POLYOXYMETHYLENE-POLYURETHANE TYPE ALLOY

[75] Inventors: Noriyoshi Yano, Zushi; Toshihiko Fujita, Yokohama, both of Japan

[73] Assignee: Nippon Polyurethane Industry Co., Ltd., Tokyo, Japan

[21] Appl. No.: 361,221

[22] Filed: Jun. 5, 1989

Related U.S. Application Data

[63] Continuation-in-part of Ser. No. 7/145,562, Jan. 19, 1988, abandoned.

[30] Foreign Application Priority Data

Jan. 23, 1987 [JP] Japan .................................. 62-12294

[51] Int. Cl.$^5$ .............................................. C08L 59/00
[52] U.S. Cl. .................... 525/399; 525/410; 525/456; 524/590; 524/594; 524/542

[58] Field of Search ................................. 525/399, 410

[56] References Cited

U.S. PATENT DOCUMENTS 4,707,525 11/1987 LaNieve et al. .................... 525/399
4,804,716 2/1989 Flexman, Jr. ....................... 525/399

Primary Examiner—Lewis T. Jacobs
Assistant Examiner—David W. Woodward
Attorney, Agent, or Firm—Davis Hoxie Faithfull & Hapgood

[57] ABSTRACT

A process for producing a polyoxymethylene-polyurethane type alloy, which comprises allowing a polyisocyanate compound, a short chain polyol with a molecular weight of 62 to 350, a long chain polyol with a number-average molecular weight of 400 to 5,000, and optionally additives to react with each other in the presence of at least one or polyoxymethylene polymers.

15 Claims, No Drawings

PROCESS FOR PRODUCING POLYOXYMETHYLENE-POLYURETHANE TYPE ALLOY

This application is a continuation in part of 07/145,562, filed Jan. 19, 1988 now abandoned.

BACKGROUND OF THE INVENTION

1. Field of the Invention

This invention relates to a process for producing a polyoxymethylene-polyurethane type alloy, more particularly to a process for producing a poly-oxymethylene-polyurethane type alloy which comprises allowing a polyisocyanate compound to react with polyols in the presence of a polyoxymethylene compound.

The composition of the present invention is useful as construction materials for industry and various functional material parts, etc.

2. Related Background Art

Polyoxymethylene polymer and polyoxymethylene copolymer (hereinafter called comprehensively as POM) have well balanced mechanical properties, creep resistance as well as high elastic recovery, fatigue resistance, frictional resistance, chemical resistance, hot water resistance, etc., and also good workability, and hence called also as the engineering plastic of engineering plastics and have been used steadily and progressively in such fields of high degree of assembly working such as electrical, electronics industries or automobile industries and precise mechanical industries. However, they have the drawback in inferior flexibility and impact resistance.

On the other hand, polyurethane (hereinafter called PU) has been used in various fields, because it is excellent in abrasion resistance, low temperature characteristic, flexibility, impact resistance, etc. and its physical property can be easily varied over a wide range from soft to hard according to a combination of the constituent starting materials.

It has been proposed in the technique to make composites of POM and PU, which have been provided for uses such as gears for highly impact resistance, soft gears for prevention of noise, gears for ascending and descending windows of automobiles, and ski binding.

According to the composite formation methods of the prior art, all are restricted in aspect of workability and the scope of application, and had the drawbacks such that many complicated steps are required in the preparation of the alloy, that the molded products had tackiness, or that the strength at the welded portion of the molded product is extremely lowered.

More specifically, the following methods have been known for making composites of POM and PU.

(1) Blend of POM and a thermoplastic polyurethane:

In order to obtain a highly impact resistant and soft material within the range which does not lose the good essential properties of POM even if the elastic coefficient may be more or less lowered, it has been proposed to blend POM with a thermoplastic polyurethane (hereinafter called TPU) and practicably utilized in a part of the fields. However, since TPU is generally shaped in flakes or pellets of several mm, when blended with pellets or powder of POM, its processability is bad. Also, conventional TPU is poorly compatible with POM, particularly TPU with a hardness of 90° or higher according to Type A of JIS A K6301 is substantially hardly compatible to give a non-homogeneous blend, thus involving the problems of insufficient mechanical strength of the molded product and bad appearance.

If blending is effected with elongated kneading time, elevated kneading temperature and strengthened shear force in order to increase homogeneity, formaldehyde through decomposition of POM will be vigorously generated to lower excessively the working environment.

Also, even if a homogeneous POM-PU composite may be obtained by use of a soft TPU, depending on the conditions during injection molding, interlaminer peeling phenomenon is liable to occur, whereby the strength of the molded product tends to be lowered.

(2) Modified oxymethylene polymer having POM and TPU coupled by polyisocyanate:

U.S. Pat. No. 3,364,157 discloses modified oxymethylene polymers which comprises oxymethylene polymer coupled with a dissimilar organic polymer having a terminal or pendant group containing active or acidic hydrogen as determined by the Zerewitnoff method by a polyisocyanate or polythioisocyanate.

Here, TPU is used as the dissimilar organic polymer, but the oxymethylene copolymer obtained according to such method is lowered in compatibility when the amount of TPU is much or depending on the composition to cause readily appearance badness of the molded product, although impact resistance can be improved.

Further, the molded product or extruded product prepared from the modified oxymethylene copolymer prepared by this method has the drawback that it is tacky.

(3) Preparation of modified oxymethylene copolymer in the presence of formaldehyde:

U.S. Pat. No. 3,766,298 discloses that the above drawback of tackiness can be improved when a modified oxymethylene copolymer is produced by the method as described in (2) in the presence of formaldehyde in an amount of about 10% by weight or less based on the total weight of the reaction components.

In this case, also similarly in the case of (1), formaldehyde will be generated greatly to worsen the working environment. Also, since TPU once synthesized is used, the production cost through all the steps will be disadvantageously high.

POM is a crystalline polymer, and excellent in workability due to its low melt viscosity but inferior in impact resistance. PU is a thermoplastic resin which gives a form through pseudo-crosslinking by hydrogen bond, having high melt viscosity with poor moldability, and hence has been desired to be improved in molding characteristics, and also POM in this case is desired to be improved in impact resistance. For accomplishing these objects, composite formation of POM-PU has been proposed, but since the essential properties as the resin are different as described above, with inherent poor compatibility between POM and PU and different behaviors during melting. Hence, even if they may be formulated uniformly forcibly by mechanical microdispersion, interlaminer separation is liable to occur in the place where great shearing force such as injection molding, etc. is received, which may be considered to cause surface peeling or lowering in physical properties.

Even when POM and TPU may be coupled according to the method as disclosed in U.S. Pat. Nos. 3,364,157 and 3,766,298, POM segments and TPU segments can be coupled completely with difficulty, whereby similar phenomenon may be considered to occur.

For solving these problems, it is necessary to bond POM molecular chains and PU molecular chains according to the chemical or physical method and also select a PU composition having good compatibility with POM.

The present inventors, in view of the state of the technique as described above, have studied intensively about a method for obtaining a composite resin with PU having good flexibility and impact resistance without losing the good properties of POM at low cost, and consequently found a method for obtaining an alloy of POM and PU having excellent physical properties and improved in the drawbacks of workability of the POM-PU composite of the prior art more simply than the method of the prior art to accomplish the present invention.

SUMMARY OF THE INVENTION

More specifically, the present invention provides a process for producing a polyoxymethylene-polyurethane type alloy, which comprises allowing a polyisocyanate compound, a short chain polyol with a molecular weight of 62 to 350, a long chain polyol with a number-average molecular weight of 400 to 5,000, and optionally additives to react with each other in the presence of at least one of polyoxymethylene polymers and polyoxymethylene copolymers, which polyoxymethylene copolymer is produced by copolymerizing trioxane with a cyclic ether.

DETAILED DESCRIPTION OF THE PREFERRED EMBODIMENTS

The reaction of the present invention can be conducted in a melting system. For example, it can be practiced by kneading by means of a mill having two rolls, a Banbury mixer, a pressure type kneader or an extruder having single or multi screws, etc. Generally, it can be conducted at a temperature between about 100° C. and 250° C. Also, the reaction may be carried out preferably in the range of about 150° C. to 230° C. as the most readily operable temperature from the melted state of POM.

By forming PU in this manner within the melted system of POM, an alloy having a structure in which POM and PU are homogeneously formulated or partially copolymerized or subjected to entanglement of chains, whereby a soft material excellent in impact resistance can be provided without losing the good characteristics of POM.

Also, the alloy obtained according to the process of the present invention is excellent in workability, and its key feature resides in that impact resistance of the molded product is extremely good.

In the present invention, although it is also possible to react only a long chain polyol compound with a polyisocyanate compound without use of a short chain polyol, the urethanization reaction can be completely effected with difficulty in this case, the composition obtained is tacky on the surface, interlaminer peeling is liable to occur during molding and also mechanical strength is inferior.

According to the present invention, POM-PU type alloy is obtained in one step from POM and the starting materials constituting PU, and the key feature resides in requiring no difficult dispersing and kneading operations. For this reason, POM-PU type alloy can be obtained more efficiently and economically than the method of the prior art.

Therefore, it can be utilized for many industrial fields, and also applied for large scale construction materials.

As the polyisocyanate compound to be used in the present invention, there may be employed polyisocyanate compounds, including diisocyanates such as 2,4- and 2,6-tolylenediisocyanate, m- and p-phenylenediisocyanate, 1-chlorophenylene-2,4-diisocyanate, 1,5-naphthalenediisocyanate, methylenebisphenylene-4,4'-diisocyanate, m- and p-xylylenediisocyanate, hexamethylenediisocyanate, lysinediisocyanate, 4,4'-methylenebis(cyclohexylisocyanate), isophoronediisocyanate, trimethylhexamethylenediisocyanate, and the like; triisocyanates such as 1,6,11-undecanetriisocyanate, lysine ester triisocyanate, 4-isocyanatemethyl-1,8-octamethylene diisocyanate and the like; or polyfunctional isocyanates such as polyphenyl methane polyisocyanate; and dimers or trimers of these polyisocyanate compounds; and compounds having terminal isocyanate groups obtained by the reaction of the abovementioned polyisocyanate with active hydrogen compounds such as the abovementioned short chain, long chain polyols or water and amino compounds.

Also, as the polyisocyanate compound, there may be included blocked polyisocyanate compounds which are stabilized by blocking the above polyisocyanate compounds with a blocking agent such as active methylene compounds, oximes, lactams, phenols, alkylphenols, basic nitrogen-containing compounds, etc. and regenerating isocyanate groups by heating.

Further, as the polyisocyanate compound, several kinds of the above polyisocyanate compounds can be used as a mixture, and also a solution of the above polyisocyanate compound can be used.

The short chain polyol to be used in the present invention may be aliphatic, alicyclic, aromatic, substituted-aromatic or heterocyclic dihydroxy compound, trihydroxy compound, tetrahydroxy compound, etc., and selected from, for example, 1,2-ethanediol, 1,2-propanediol, 3-methyl-1,5-pentanediol, 1,4-butanediol, butenediol, 1,6-hexanediol, 1,10-decamethylenediol, 2,5-dimethyl-2,5-hexanediol, neopentyl glycol, diethylene glycol, 1,4-cyclohexane dimethanol, bis($\beta$-hydroxyethoxy)benzene, p-xylenediol, dihydroxyethyltetrahydrophthalate, trimethylolpropane, glycerine, 2-methylpropane-1,2,3-triol, 1,2,6-hexanetriol, pentaerythritol, amino alcohols such as ethanolamine, and methyldiethanolamine, etc. Further, water can be also used in place of the short chain polyol.

As the long chain polyol to be used in the present invention, there may be employed polyester polyol, polyether polyol, polycarbonate polyol, vinyl type polyol, diene type polyol, castor oil type polyol, silicone polyol, polyolefin type polyol, and copolymers thereof.

These long chain polymers employed preferably have number-average molecular weights ranging from 400 to 5,000, more preferably from 500 to 3,000.

Examples of the polyester polyol having terminal hydroxyl groups may include those obtained by the reaction between dicarboxylic acids such as succinic acid, glutaric acid, adipic acid, azelaic acid, sebacic acid, dodecanoic acid, phthalic anhydride, isophthalic acid, tetrahydrophthalic anhydride, hexahydrophthalic anhydride, maleic anhydride, fumaric acid, itaconic acid, etc. and a polyhydroxy compound selected from the short chain polyols as described above.

The polyester polyol having terminal hydroxyl groups can be also obtained by the reaction between a lactone compound such as 62-propiolactone, pivalolactone, δ-valerolactone, β-methyl-δ-valerolactone, ε-caprolactone, methyl-ε-caprolactone, dimethyl-ε-caprolactone, trimethyl-ε-caprolactone, etc. and a polyhydroxy compound selected from the short chain polyols as described above, etc.

As the polyether polyol, polytetramethylene gylcol, polyethylene glycol, polypropylene glycol, copolymer thereof, etc. may be employed.

As the polycarbonate polyol, those obtained by the transesterification between a polyhydroxy compound selected from the short chain polyols as described above and a diaryl carbonate, a dialkyl carbonate or an ethylene carbonate. For example, poly-1,6-hexamethylene carbonate, poly-2,2'-bis(4-hydroxyhexyl)propane carbonate, etc. are industrially produced and readily available.

As another method for obtaining polycarbonate polyol, the so-called phosgene method (or the solvent method) can be employed.

Otherwise, vinyl type polyols such as acrylic polyols, etc. obtained by copolymerization of an acrylic monomer having hydroxyl group such as α-hydroxyethyl acrylate, α-hydroxyethyl methacrylate, etc. with an acrylic acid ester; polybutadiene polyols such as poly(1,4-butadine), poly(1,2-butadiene), etc.; castor oil type polymers such as polypropylene glycol ricinoleate, etc.; or silicone polyols; polyolefinic polyols, etc. can be used.

Several kinds of the above short chain and long chain polyols can be also used in combination.

The polyoxymethylene polymer to be used in the present invention may be one which is prepared by continuous polymerization according to gas phase, liquid phase, solid phase or solution surface gas phase polymerization of purified formaldehyde or mass polymerization of trioxane.

For example, there may be employed a white polymer with uniform polymerization degree which is produced by carrying out polymerization by blowing formaldehyde into a solution of a quaternary ammonium salt, a quaternary phosphonium salt or a tertiary sulfonium slat as the polymerization initiator and other components in an inert organic solvent.

The polyoxymethylene polymer may be preferably one subjected to stabilization by an end group treatment according to etherification, esterification or urethanization.

The polyoxymethylene copolymer to be used in the present invention may be one which is produced by, for example, copolymerization of trioxane with either one of various cyclic ethers having at least two adjacent carbon atoms such as ethylene oxide, dioxorane, etc. The oxymethylene copolymer to be used in the present invention thus obtained may be a polymer having a structure of recurring units represented by the general formula:

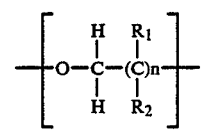

wherein each $R_1$ and $R_2$ is selected from the group consisting of hydrogen, lower alkyl, and halo-substituted lower alkyl groups, and n is an integer of zero to 3, inclusive, and n is zero in from 85 to 99.9 mole percent of the recurring units. Each lower alkyl group preferably has one to two carbon atoms, inclusive.

The term "copolymer" used in the specification and claims of the present invention means a polymer containing 2 or more different monomeric units, including terpolymers, tetrapolymers or higher multicomponent polymers.

Further, the polyoxymethylene polymer and the polyoxymethylene copolymer employed may be those increased in stability by incorporating antioxidants, thermal stabilizers, and pigments mixed in the resin. Further, oxymethylene polymers coupled with dissimilar organic polymers can be used.

The polyisocyanate compound, the short chain polyol, the long chain polyol, and POM used in the present invention can be supplied in various proportions so as to control the properties of the composition obtained, but the amount of POM may be preferably 10 to 95% by weight, most preferably 40 to 90%, based on the total weight.

The ratio of the short chain polyol to the long chain polyol to be used in the present invention may be preferably 0.1 to 20 of short chain polyol/long chain polyol in terms of molar ratio, preferably 0.1 to 1.5 in the case of obtaining a soft composition with impact resistance, etc. being made great account of. Further, preferably, although it may differ depending on the long chain polyol employed, the mean molecular weight when the short chain polymer and the long chain polymer were mixed ranges 450 to 4,000.

The polyisocyanate compound used in the present invention may be 0.5 to 10 of NCO/OH ratio relative to the total of the above short chain polyol and the long chain polyol, which can be used variously depending on the physical properties demanded.

Ordinarily, NCO/OH ratio of 0.9 to 1.2 is preferable, but by making NCO/OH ratio 1.3 or higher, excessive NCO groups will undergo the crosslinking reaction to take a structure approximate to a thermosetting resin. On the other hand, when the ratio of NCO/OH is less than 0.5, the molecular weight of PU thus prepared can not be sufficiently made high. Thus, the product obtained is difficult to develop an excellent mechanical strength and tends to have drawbacks such as surface tackiness and the like.

The additives which can be optionally used in the present invention may include stabilizers, lubricants, fillers, colorants, and other resins reactive or non-reactive with isocyanate radical which can be blended, etc.

For enhancing the reaction rate, if necessary, a catalyst may be added, and as such catalyst, conventional urethanization reaction catalysts can be used. Suitable catalysts may include tertiary amines such as triethylamine, tributylamine, triethanolamine, etc., organic tin compounds such as dibutyltindiulaurate, stannous caprolate, etc.

The catalyst may be preferably added in an amount of 0.001 to 0.01% by weight based on the total amount of the short chain and long chain polyols and the polyisocyanate compound.

The present invention is described in more detail by referring to Examples. In the following Examples and Comparative examples, parts indicate parts by weight.

Measurement of physical properties was performed at 23° C. according to the ASTM methods. The ASTM standard numbers of the respective measurement methods are written below.

(1) Tensile test (tensile strength, elongation): D-638.
(2) Impact resistance, notched: D-256.

EXAMPLE 1

A mixture or 700 parts of Duracon M90-01 (polyoxymethylene copolymer, produced by Polyplastics K.K.), 11.4 parts of 1,4-butanediol (hereinafter referred to as 1,4-BD), 205 parts of Nippollan 4009 (polyesterdiol, number-average molecular weight 1,000, produced by Nippon Polyurethane Industry), 83.6 parts of Millionate MT (diphenylmethane diisocyanate, produced by Nippon Polyurethane Industry), and 0.03 parts of dibutylindilaurate (hereinafter referred to as DBTDL) was subjected to a kneading reaction in a pressure type kneader (produced by Moriyama Seisakusho) at 160° C. for one hour. The resin obtained was applied to a crushing machine to obtain flakes of about 3 mm square.

By use of the flakes, a flat plate with a thickness of 2 mm was prepared by injection molding, and the tensile properties and the notched Izod impact strength were measured. The results are shown in Table 1.

EXAMPLE 2

Example 1 was repeated except for using 900 parts of Derlin 500 (polyoxymethylene polymer, produced by Du Pont), 4.4 parts of 1,4-BD, 80 parts of Nippollan 4042 (polyester diol, number-average molecular weight 2,000, produced by Nippon Polyurethane Industry), 15.6 parts of 1,6-hexamethylene diisocyanate (hereinafter referred to as 1,6-HDI, produced by Nippon Polyurethane Industry), and 0.03 parts of DBTDL, to obtain a resin in flakes.

EXAMPLE 3-6

Example 1 was repeated except for varying the constitution of Duracon M90-01, 1,4-BD, polyester (Nippollan 4056 is a polyester diol, number-average molecular weight 750, produced by Nippon Polyurethane Industry), polyisocyanate, and DBTDL as shown in Table 1, to obtain resins in flakes.

By used of the resins 2-6, physical properties were measured similarly to that used in Example 1. The results are shown in Table 1.

Comparative example 1

A mixture of 11.4 parts of 1,4-BD, 205 parts of Nippollan 4009, 83.6 parts of Millionate MT, and 0.03 parts of DBTDL was subjected to a kneading reaction in a pressure kneader at 120° C. for 1 hour. The polyurethane resin obtained was applied to a crushing machine to obtain flakes of about 3 mm square. The resin obtained had the physical properties of a hardness of 83° C. (JIS A at 20° C.), a tensile strength of 430 kg/cm$^2$, and an elongation of 300% or more.

Comparative example 2

Example 1 was repeated except for using 700 parts of Duracon M90-91, 237 parts of Nippollan 4009, 63 parts of Millionate MT and 0.03 parts of DBTDL to obtain a resin in flakes. The resin obtained had tackiness on the surface. The results of the physical properties measured are shown in Table 1.

Comparative example 1

A mixture of 700 parts of Duracon M90-01, 300 parts of the polyurethane resin obtained in Comparative example 1, and 4 parts of Millionate MT was subjected to a kneading reaction in a pressure kneader at 160° C. for 1 hour. Otherwise, the procedure of Example 1 was repeated to give a resin in flakes. The results of measurement of physical properties are shown in Table 1.

TABLE 1

|  |  | Example |  |  |  |  |  | Comparative example |  |  |
|---|---|---|---|---|---|---|---|---|---|---|
|  |  | 1 | 2 | 3 | 4 | 5 | 6 | 1 | 2 | 3 |
| Ingredient | Duracon M90 - 01 | 700 |  | 900 | 450 | 700 | 400 |  | 700 | 700 |
|  | Derlin 500 |  | 900 |  | 450 |  |  |  |  |  |
|  | 1, 4 - BD | 11.4 | 4.4 | 0.4 | 4.4 | 12 | 22.8 | 11.4 |  |  |
|  | Nippollan 4056 |  |  | 6.0 |  |  |  |  |  | 300 parts of the |
|  | Nippollan 4009 | 205 |  |  |  |  | 410 | 205 | 237 | polyurethane of |
|  | Nippollan 4042 |  | 80 |  | 80 | 223 |  |  |  | comparative example 4 |
|  | Millionate MT | 83.6 |  |  |  | 65 | 167.2 | 83.6 | 63 |  |
|  | 1, 6-HDI |  | 15.6 | 3.6 | 15.6 |  |  |  |  |  |
|  | DBTDL | 0.03 | 0.01 | 0.03 | 0.01 | 0.03 | 0.06 | 0.03 | 0.03 |  |
| Physical Properties | Tensile strength Tensile (Kg/cm$^2$) | 290 | 550 | 500 | 500 | 300 | 400 | 430 | 280 | 300 |
|  | Elongation (%) | 300 | 60 | 95 | 80 | >300 | >300 | >300 | 150 | 150 |
|  | Impact resistance Izod (Kg cm/cm) (Notched) | 50 | 14 | 12 | 12 | 60 | >100 | — | 12 | 10 |
|  | Appearance of article | Good | Good | Good | Good | Good | Good | Slightly tacky | Tacky and interlaminer peeling | Wrinkle on surface |

The polyoxymethylene-polyurethane type alloy thus prepared has adequate hardness and good impact resistance, and also good moldability, and therefore a large scale injection molded product can be produced easily.

Further, the alloy according to the present invention has a great advantage in that it can be produced at lower cost and better efficiency than the polyoxymethylene-polyurethane type alloy of the prior art.

By utilizing these properties, the alloy can be utilized in many industrial fields, and it can be used for various gears or turbines of the parts receiving high impact, driving gears for prevention of noise in acoustic instruments, etc., as a matter of course, and also optimally for housing for electric and electronic instrument, construction materials for use in automobiles, etc.

What is claimed is:

1. A process for producing a polyoxymethylene-polyurethane alloy, which comprises allowing a polyisocyanate compound, a short chain polyol with a molecular weight of 62 to 350, and a long chain polyol with a number-average molecular weight of 400 to 5,000, to react with each other in the presence of at least one polyoxymethylene polymer.

2. A process according to claim 1, wherein the amount of polyoxymethylene used ranges from 10 to 95% by weight based on the total weight of said alloy.

3. A process according to claim 1, wherein the amount of polyoxymethylene used ranges from 40 to 90% by weight based on the total weight of said alloy.

4. A process according to claim 1, wherein the ratio of said short chain polyol to said long chain polyol used ranges from 0.1 to 20.

5. A process according to claim 1, wherein the average molecular weight of the mixture of said short chain polyol and long chain polyol ranges from 450 to 4000.

6. A process according to claim 1, wherein the NCO/OH ratio of said polyisocyanate to the total of said short chain polyol and said long chain polyol ranges from 0.5 to 10.

7. A process according to claim 1, wherein the NCO/OH ratio of said polyisocyanate to the total of said short chain polyol and said long chain polyol ranges from 0.9 to 1.2.

8. A process according to claim 1, wherein said polyisocyanate is methylenebisphenylene-4,4'-diisocyanate.

9. A process according to claim 1, wherein said polyisocyanate is hexamethylenediisocyanate.

10. A process according to claim 1, wherein said short chain polyol is 1,4-butanediol.

11. A process according to claim 1 wherein the reaction is carried out in the presence of a thermal stabilizer and a pigment.

12. A process according to claim 1 wherein the process is carried out in the presence of an antioxidant.

13. A process according to claim 1 wherein the polyoxymethylene polymer is a copolymer produced by copolymerizing trioxane with a cyclic ether.

14. A process according to claim 1, wherein said polyoxymethylene polymer is a polymer having a structure of recurring units represented by the general formula:

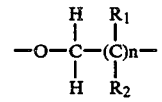

wherein $R_1$ and $R_2$ can be the same or different and are selected from the group consisting of hydrogen, lower alkyl, and halo-substituted lower alkyl groups, and n is an integer of zero to 3, inclusive, and n is zero in from 85 to 99.9 mole percent of the recurring units.

15. A process according to claim 14 wherein each of said lower alkyl groups has from one to two carbon atoms.

* * * * *